US012649128B2

(12) United States Patent
Yu et al.

(10) Patent No.: US 12,649,128 B2
(45) Date of Patent: Jun. 9, 2026

(54) HIGH TEMPERATURE-RESISTANT COMPOSITE NANOFILTRATION MEMBRANE AND PREPARATION METHOD THEREOF

(71) Applicant: Hunan OVAY Technology Co., Ltd., Zhuzhou (CN)

(72) Inventors: Hui Yu, Zhuzhou (CN); Hongwei Lu, Zhuzhou (CN); Bo Peng, Zhuzhou (CN); Qunhui Hu, Zhuzhou (CN); Qian Liao, Zhuzhou (CN); Pan He, Zhuzhou (CN); Yanbo He, Zhuzhou (CN); Jun Peng, Zhuzhou (CN)

(73) Assignee: Hunan OVAY Technology Co., Ltd., Zhuzhou (CN)

( * ) Notice: Subject to any disclaimer, the term of this patent is extended or adjusted under 35 U.S.C. 154(b) by 318 days.

(21) Appl. No.: 18/221,746

(22) Filed: Jul. 13, 2023

(65) Prior Publication Data

US 2024/0100488 A1     Mar. 28, 2024

(30) Foreign Application Priority Data

Sep. 27, 2022     (CN) ......................... 202211185175.5

(51) Int. Cl.
B01D 69/12          (2006.01)
B01D 61/02          (2006.01)
(Continued)

(52) U.S. Cl.
CPC ......... B01D 69/125 (2013.01); B01D 61/027 (2013.01); B01D 67/0006 (2013.01);
(Continued)

(58) Field of Classification Search
CPC ......... C02F 1/44; C08G 73/14; Y02A 20/131; B01D 61/027; B01D 61/02;
(Continued)

(56) References Cited

U.S. PATENT DOCUMENTS

| | | | | |
|---|---|---|---|---|
| 2011/0192281 A1* | 8/2011 | Hosseini | ................ | C08G 73/14 |
| | | | | 96/10 |
| 2014/0060324 A1* | 3/2014 | Ahn | ..................... | B01D 71/701 |
| | | | | 96/10 |
| 2021/0370239 A1* | 12/2021 | Kharul | ................... | B01D 71/82 |

FOREIGN PATENT DOCUMENTS

| | | | | | |
|---|---|---|---|---|---|
| CN | 103111195 A | * | 5/2013 | ............. | B01D 67/00 |
| CN | 103432913 A | * | 12/2013 | ............. | B01D 67/00 |

OTHER PUBLICATIONS

CN 103111195 A English description, May 22, 2013, Peng Bo et al.*
CN 103432913 A English description, Dec. 11, 2013, Jiang Ying et al.*

* cited by examiner

*Primary Examiner* — Akash K Varma
(74) *Attorney, Agent, or Firm* — JEEN IP LAW, LLC

(57)          ABSTRACT

Provided are a high temperature-resistant composite nanofiltration membrane and a preparation method thereof. The high temperature-resistant composite nanofiltration membrane includes a base membrane and a polyamide membrane arranged on the base membrane; wherein the polyamide membrane is prepared from raw materials comprising: an amine, an inorganic salt, a silane additive, a polyacyl chloride, and an oil phase solvent; and the silane additive is at least one selected from the group consisting of 3-aminopropyltriethoxysilane, divinyltriaminopropyltrimethoxysilane, N-cyclohexyl-γ-aminopropyltrimethoxysilane, and trimethoxy[3-(phenylamino)propyl]silane.

3 Claims, 1 Drawing Sheet

(51) Int. Cl.

| | | |
|---|---|---|
| *B01D 67/00* | (2006.01) | |
| *B01D 69/02* | (2006.01) | |
| *B01D 71/56* | (2006.01) | |
| *B01D 71/62* | (2006.01) | |
| *B01D 71/68* | (2006.01) | |

(52) U.S. Cl.
CPC ......... *B01D 67/0083* (2013.01); *B01D 69/02* (2013.01); *B01D 71/56* (2013.01); *B01D 71/62* (2013.01); *B01D 71/68* (2013.01); *B01D 2323/081* (2022.08); *B01D 2323/12* (2013.01); *B01D 2323/14* (2013.01); *B01D 2323/21817* (2022.08); *B01D 2323/2182* (2022.08); *B01D 2323/219* (2022.08); *B01D 2323/40* (2013.01); *B01D 2325/22* (2013.01)

(58) Field of Classification Search
CPC ............ B01D 67/0006; B01D 67/0083; B01D 67/00; B01D 69/125; B01D 69/02; B01D 69/00; B01D 69/12; B01D 71/56; B01D 71/62; B01D 71/68; B01D 71/82; B01D 71/701; B01D 2323/219; B01D 2323/081; B01D 2323/2182; B01D 2323/21817; B01D 2323/12; B01D 2323/14; B01D 2323/40; B01D 2323/30; B01D 2325/22
USPC .................................................. 210/500.38
See application file for complete search history.

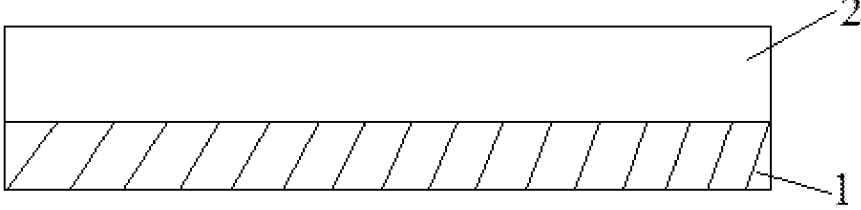

HIGH TEMPERATURE-RESISTANT COMPOSITE NANOFILTRATION MEMBRANE AND PREPARATION METHOD THEREOF

CROSS REFERENCE TO RELATED APPLICATION

This patent application claims the benefit and priority of Chinese Patent Application No. 202211185175.5 filed with the China National Intellectual Property Administration on Sep. 27, 2022, the disclosure of which is incorporated by reference herein in its entirety as part of the present application.

TECHNICAL FIELD

The present disclosure relates to the technical field of nanofiltration membrane preparation, in particular to a high temperature-resistant composite nanofiltration membrane and a preparation method thereof.

BACKGROUND

A large amount of high-temperature wastewater will be generated during the production of medicine, food, and chemical industrial products. Recycling the high-temperature wastewater could not only reduce the discharge of wastewater, but also recover a large number of heat sources, thereby achieving water saving and energy saving simultaneously.

Therefore, it has become a major challenge about how to recycle high-temperature wastewater. Since the high-temperature wastewater contains bacteria, viruses, organic matters, and inorganic salts with different valence states, it is mostly recycled by filtration with membrane materials. Membrane materials commonly used in the industry include ultrafiltration membranes, reverse osmosis membranes, and nanofiltration membranes. Comparing with the ultrafiltration membrane, the nanofiltration membrane could highly intercept bacteria and viruses to ensure the safety of aqueous media. Comparing with the reverse osmosis membrane, the nanofiltration membrane could selectively separate inorganic salts with different valence states, thereby reducing operating pressure and energy consumption. In addition, the nanofiltration membrane could also effectively intercept organic matters.

However, conventional nanofiltration membranes have a maximum temperature tolerance of 45° C. In practice, when a temperature of the aqueous medium exceeds 45° C., the effective use of nanofiltration membranes may be limited. For example, the filtration performance of the nanofiltration membrane may be reduced, and even the structure of the nanofiltration membrane may be destroyed.

SUMMARY

The present disclosure aims to provide a high temperature-resistant composite nanofiltration membrane and a preparation method thereof, which makes it possible to address the problem that conventional nanofiltration membrane has a lower temperature tolerance, and ensure that the prepared high temperature-resistant composite nanofiltration membrane has high-temperature tolerance of 70° C.; that is, even under high-temperature conditions, the high temperature-resistant composite nanofiltration membrane could still be used to recycle high-temperature wastewater. The following specific technical solutions are adopted:

In a first aspect, the present disclosure provides a high temperature-resistant composite nanofiltration membrane, including a base membrane and a polyamide membrane arranged on the base membrane; wherein the polyamide membrane is prepared from raw materials comprising: an amine, an inorganic salt, a silane additive, a polyacyl chloride, and an oil phase solvent; and the silane additive comprises at least one selected from the group consisting of 3-aminopropyltriethoxysilane, divinyltriaminopropyltrimethoxysilane, N-cyclohexyl-γ-aminopropyltrimethoxysilane, and trimethoxy[3-(phenylamino)propyl]silane.

In some embodiments, the inorganic salt comprises at least one selected from the group consisting of sodium chloride, calcium chloride, calcium bromide, and lithium chloride.

In some embodiments, the amine comprises at least one selected from the group consisting of piperazine, 1,6-hexanediamine, 1,4-diaminocyclohexane, and m-phenylenediamine.

In some embodiments, the polyacyl chloride comprises at least one selected from the group consisting of trimesoyl chloride, phthaloyl chloride, isophthaloyl chloride, terephthaloyl chloride, 4,4'-biphenyldicarbonyl chloride, succinyl chloride, glutaryl dichloride, adipoyl chloride, and cyclohexyl-1,4-dicarboxylchloride (CAS: 13170-66-6, which is available from chemicalbook.com).

In some embodiments, the oil phase solvent comprises at least one selected from the group consisting of n-hexane, cyclohexane, and heptane.

In some embodiments, the base membrane is prepared from raw materials comprising: polyethersulfone resin (polyethersulfone resin: BASF (PES, E6020P, molecular weight: 75,000), Ultrason BASF E6020P Germany BASF-Guidechem (guidechem.com)), polybenzimidazole resin (polybenzimidazole resin: CAS No: 25928-81-8, Innochem stock 25928-81-8 (inno-chem.com.cn)), and N-methylpyrrolidone.

In a second aspect, the present disclosure provides a method for preparing the high temperature-resistant composite nanofiltration membrane as described in the above technical solutions, including the following steps:

preparation of an aqueous phase solution:

mixing the amine, the inorganic salt, the silane additive, and deionized water evenly at a mass ratio of (0.5-3):(0.5-3):(0.5-3):(91-98.5) to obtain the aqueous phase solution;

preparation of an oil phase solution:

mixing the polyacyl chloride and the oil phase solvent at a mass ratio of (0.05-1):(99-99.95) to obtain the oil phase solution;

preparation of the high temperature-resistant composite nanofiltration membrane:

immersing the base membrane in the aqueous phase solution to obtain a primary base membrane; and then immersing the primary base membrane in the oil phase solution to obtain an immersed base membrane; and subjecting the immersed base membrane to a heat treatment to obtain the high temperature-resistant composite nanofiltration membrane.

In some embodiments, before immersing the base membrane, the method for preparing the high temperature-resistant composite nanofiltration membrane further comprises a step of preparing the base membrane, which is performed as follows:

mixing the polyethersulfone resin, the polybenzimidazole resin, and the N-methylpyrrolidone at a mass ratio of 13:2:85 to obtain a mixture, and stirring the mixture for 4 h to 24 h under heating to obtain a uniformly-dispersed casting solution;

subjecting the casting solution to filtration and vacuum degassing in sequence to obtain a primary casting solution;

coating the primary casting solution evenly onto a non-woven fabric by a membrane casting machine to form a wet membrane; and subjecting the wet membrane to pretreatment and curing in sequence to obtain the base membrane.

In some embodiments, during the preparation of the base membrane, the stirring is performed at a rate of 100 rpm to 900 rpm, and in some embodiments, the heating is performed at a temperature of 50° C. to 90° C.

In some embodiments, the pretreatment is performed by subjecting the wet membrane to evaporation at room temperature for 3 s to 10 s to obtain a pretreated wet membrane.

In some embodiments, the wet membrane has a thickness of 150 μm to 170 μm.

In some embodiments, the curing is performed by immersing the pretreated wet membrane in ultrapure water at 5° C. to 16° C. for gel curing to form a preformed membrane; and then immersing the preformed membrane in water at 20° C. to 40° C. for complete curing to form the base membrane.

In some embodiments, during the preparation of the high temperature-resistant composite nanofiltration membrane, the base membrane is immersed in the aqueous phase solution for 15 s to 25 s, and after that, a residual aqueous phase solution on a surface of the base membrane is removed by using a rubber roller to obtain the primary base membrane; in some embodiments, the primary base membrane is immersed in the oil phase solution for 10 s to 20 s, and after that, a residual oil phase solution on the surface of the base membrane is removed by using the rubber roller to obtain the immersed base membrane.

In some embodiments, the heat treatment is performed by subjecting the immersed base membrane to heat preservation in an oven at 30° C. to 90° C., and in some embodiments, the heat preservation is conducted for 1 min to 30 min.

Some embodiments of the present disclosure at least have the following beneficial effects.

(1) In the present disclosure, an inorganic salt in the raw materials for preparing the high temperature-resistant composite nanofiltration membrane could enhance an interfacial tension between the aqueous phase solution and the oil phase solution, and reduce the migration of aqueous phase reactive monomers into the oil phase solvent. In this way, an interfacial reaction is weakened, thereby reducing a cross-linking degree of the poly-amide membrane layer, and improving a water flux of the high temperature-resistant composite nanofiltration membrane.

The silane additive containing amino groups in the raw materials could be introduced into the polyamide backbone. In a structure of the silane additive, an O—Si—O bond is the main chain structure, and the bond energy of a Si—O bond is 121 kcal/gram molecule (while the bond energy of a C—C bond is 82.6 kcal/gram molecule). When the silane additive is at high temperatures or under radiation irradiation, its molecular chemical bonds do not be broken or decomposed, thereby improving high-temperature resistance of the poly-amide backbone.

The silane additive has a general formula Y $(CH_2)_n SiX_3$, and has an organo-silicone monomer with more than two different reactive groups in its molecule. These reactive groups could be chemically bonded (coupled) with organic and/or inorganic material to increase an adhesion of the silane additive with these materials. In the general formula, n is an integer from 0 to 3; X is a hydrolyzable group, such as chlorine, methoxy, ethoxy, and acetoxy, which are easily hydrolyzed to generate silanol. Further, after the base membrane is immersed in the aqueous phase and dried, the inorganic salt could be deposited on a surface of the base membrane, and is easy to absorb water and deprotonate. Meanwhile the acidic silanol reacts with the deprotonated basic inorganic salt, and finally dehydrates to form an ether bond, so that the inorganic salt is introduced into the polyamide membrane to improve the water flux of the composite nanofiltration membrane. Y is an organic functional group, such as vinyl, amino, epoxy, methacryloxy, and mercapto. When Y is an amino group, it may react with a substance containing an acyl chloride group to further improve the high-temperature resistance of the polyamide backbone.

(2) In the present disclosure, a polybenzimidazole resin is used as a raw material of the base membrane. The polybenzimidazole resin could still maintain a desirable thermal stability at above 400° C. Therefore, blending the polybenzimidazole resin with the polyethersulfone resin to form a resin alloy could effectively improve the thermal stability of the base membrane.

(3) In the present disclosure, during the preparation of the base membrane, the heating and stirring conditions are controlled to ensure that the polybenzimidazole resin and the polyethersulfone resin are efficiently blended in the N-methylpyrrolidone. This makes the prepared casting solution in a uniformly dispersed state. During the preparation of the base membrane, specific process parameters, filtration, vacuum degassing, pretreatment, and curing are combined on the basis of the raw materials, such that the base membrane could be prepared with excellent high-temperature resistance.

(4) In the present disclosure, the method for preparing the high temperature-resistant composite nanofiltration membrane has advantages of simple operations, short process, and low cost, thereby showing excellent application prospects. Furthermore, a specific ratio is used in the aqueous phase solution for coating amine monomers; and a specific ratio is used in the oil phase solution for coating acyl chloride monomers. In addition, the combined use of the inorganic salt, the silane additive, and the polybenzimidazole resin could effectively improve the high-temperature resistance of the high temperature-resistant composite nanofiltration membrane.

BRIEF DESCRIPTION OF THE DRAWINGS

FIGURE shows a high temperature-resistant composite nanofiltration membrane according to one or more embodiments of the present disclosure; in which 1 represents a base membrane, and 2 represents a polyamide membrane.

DETAILED DESCRIPTION OF THE EMBODIMENTS

The technical solutions of the present disclosure will be clearly and completely described below in conjunction with specific examples of the present disclosure. Obviously, the described examples are only a part of, not all of, the examples of the present disclosure. All other examples obtained by persons of ordinary skill in the art based on the examples of the present disclosure shall fall within the scope of the present disclosure.

Example 1

A high temperature-resistant composite nanofiltration membrane consisted of a base membrane and a polyamide membrane arranged on the base membrane; wherein the polyamide membrane was prepared from an amine, an inorganic salt, a silane additive, a polyacyl chloride, and an oil phase solvent; and
the silane additive was 3-aminopropyltriethoxysilane.
The inorganic salt was calcium chloride.
The amine was piperazine.
The polyacyl chloride was trimesoyl chloride.
The oil phase solvent was n-hexane.
The base membrane was prepared from polyethersulfone resin, polybenzimidazole resin, and N-methylpyrrolidone.

A method for preparing the high temperature-resistant composite nanofiltration membrane was performed as follows:

preparation of an aqueous phase solution:
the amine, the inorganic salt, the silane additive, and deionized water were mixed evenly at a mass ratio of 1:1:1:97 to obtain the aqueous phase solution;
preparation of an oil phase solution:
the polyacyl chloride and the oil phase solvent were mixed evenly at a mass ratio of 0.2:99.8 to obtain the oil phase solution; and
preparation of the high temperature-resistant composite nanofiltration membrane:
the base membrane was immersed in the aqueous phase solution to obtain a primary base membrane, and the primary base membrane was then immersed in the oil phase solution to obtain an immersed base membrane; and the immersed base membrane was subjected to a heat treatment to obtain the high temperature-resistant composite nanofiltration membrane.

In the method for preparing the high temperature-resistant composite nanofiltration membrane, the base membrane was prepared by the following steps:

the polyethersulfone resin, the polybenzimidazole resin, and the N-methylpyrrolidone were mixed at a mass ratio of 13:2:85, and the resulting mixture was stirred for 6 h under heating to obtain a uniformly-dispersed casting solution; and
the casting solution was subjected to filtration and vacuum degassing in sequence to obtain a primary casting solution, and then the primary casting solution was evenly coated onto a non-woven fabric by a membrane casting machine to form a wet membrane, and the wet membrane was subjected to pretreatment and curing to obtain the base membrane.

During the preparation of the casting solution, the heating was performed at 70° C. and the stirring was performed at a rate of 600 rpm to obtain the uniformly-dispersed casting solution;

the pretreatment was performed by conducting evaporation on the wet membrane at 25° C. for 3 s to obtain a pretreated wet membrane; and
the wet membrane had a thickness of 150 μm; and the curing was performed as follows: the pretreated wet membrane was immersed in ultrapure water at 16° C.

for gel curing to form a preformed membrane, and then the preformed membrane was immersed in water at 25° C. for complete curing, a cured membrane was washed with water at 75° C. for 3 min (a hot water bath was used to fix membrane pores) to obtain the base membrane, and the base membrane was refrigerated in a freezer at 5° C. for later use.

During the preparation of the high temperature-resistant composite nanofiltration membrane, the base membrane was immersed in the aqueous phase solution for 20 s, and after the immersing, a residual aqueous phase solution on a surface of the base membrane was removed using a rubber roller to obtain the primary base membrane; after that, the primary base membrane was immersed in the oil phase solution for 15 s, and after the immersing, a residual oil phase solution on the surface of the base membrane was removed using the rubber roller to obtain the immersed base membrane; and the heat treatment is performed by conducting heat preservation on the immersed base membrane (i.e., a base membrane obtained after immersing in the oil phase solution) in an oven at 70° C. for 5 min.

Example 2

This example was performed as described in Example 1, except that the amine was 1,6-hexanediamine.

Example 3

This example was performed as described in Example 1, except that the amine was m-phenylenediamine.

Example 4

This example was performed as described in Example 1, except that the polyacyl chloride was isophthaloyl chloride.

Example 5

This example was performed as described in Example 1, except that the polyacyl chloride was terephthaloyl chloride.

Example 6

This example was performed as described in Example 1, except that the inorganic salt was lithium chloride.

Example 7

This example was performed as described in Example 1, except that the inorganic salt was calcium bromide.

Example 8

This example was performed as described in Example 1, except that the silane additive was N-cyclohexyl-γ-aminopropyltrimethoxysilane.

Example 9

This example was performed as described in Example 1, except that the amine, the inorganic salt, the silane additive, and the deionized water were at a mass ratio of 1:1:0.5:97.5.

Example 10

This example was performed as described in Example 1, except that the amine, the inorganic salt, the silane additive, and the deionized water were at a mass ratio of 1:0.5:1:97.5.

Example 11

This example was performed as described in Example 1, except that the amine, the inorganic salt, the silane additive, and the deionized water were at a mass ratio of 1:1:3:95.

Example 12

This example was performed as described in Example 1, except that the amine, the inorganic salt, the silane additive, and the deionized water were at a mass ratio of 1:3:3:93.

Example 13

This example was performed as described in Example 1, except that the silane additive consisted of divinyltriamino-propyltrimethoxysilane and N-cyclohexyl-γ-aminopropylt-rimethoxysilane at a mass ratio of 1:1.

Example 14

This example was performed as described in Example 1, except that the inorganic salt consisted of sodium chloride and lithium chloride at a mass ratio of 1:1.

Example 15

This example was performed as described in Example 1, except that the amine consisted of 1,6-hexanediamine, 1,4-diaminocyclohexane, and m-phenylenediamine at a mass ratio of 1:1:0.5.

Example 16

This example was performed as described in Example 1, except that the polyacyl chloride consisted of isophthaloyl chloride, terephthaloyl chloride, and 4,4'-biphenyldicarbo-nyl chloride at a mass ratio of 0.9:1:0.5.

Example 17

This example was performed as described in Example 1, except that during the preparation of the casting solution, the heating was performed at 75° C.

Example 18

This example was performed as described in Example 1, except that during the preparation of the base membrane, the evaporation was conducted on the wet membrane at 25° C. for 5 s.

Example 19

This example was performed as described in Example 1, except that during the preparation of the base membrane, the wet membrane had a thickness of 170 μm.

Example 20

This example was performed as described in Example 1, except that the curing was performed as follows: the pretreated wet membrane was immersed in ultrapure water at 12° C. for gel curing to form a preformed membrane, and then the preformed membrane was immersed in water at 25° C. for complete curing to form the base membrane.

Example 21

This example was performed as described in Example 1, except that during the preparation of the casting solution, the heating was performed at 60° C.

Example 22

This example was performed as described in Example 1, except that during the preparation of the casting solution, the heating was performed at 80° C.

Comparative Example 1

This example was performed as described in Example 1, except that no silane additive was used, and the amine, the inorganic salt, the silane additive, and the deionized water were at a mass ratio of 1:1:0:98.

Comparative Example 2

This example was performed as described in Example 1, except that no polybenzimidazole resin was added, and the polyethersulfone resin, the polybenzimidazole resin, and the N-methylpyrrolidone were at a mass ratio of 15:0:85.

Comparative Example 3

This example was performed as described in Example 1, except that no inorganic salt was added, and the amine, the inorganic salt, the silane additive, and the deionized water were at a mass ratio of 1:0:1:98.

Comparative Example 4

This example was performed as described in Example 1, except that the amine, the inorganic salt, the silane additive, and the deionized water were at a mass ratio of 0.4:0.4:0.4:98.8.

Comparative Example 5

This example was performed as described in Example 1, except that the amine, the inorganic salt, the silane additive, and the deionized water were at a mass ratio of 3.2:3.2:3.2:90.4.

Comparative Example 6

This example was performed as described in Example 1, except that during the preparation of the casting solution, the heating was performed at 40° C.

Comparative Example 7

This example was performed as described in Example 1, except that during the preparation of the casting solution, the heating was performed at 100° C.

Comparative Example 8

This example was performed as described in Example 1, except that during the preparation of the base membrane, the wet membrane had a thickness of 140 μm.

Comparative Example 9

This example was performed as described in Example 1, except that during the preparation of the base membrane, the wet membrane had a thickness of 180 μm.

Comparative Example 10

This example was performed as described in Example 1, except that during the preparation of the base membrane, no pretreatment was conducted.

Comparative Example 11

This example was performed as described in Example 1, except that the curing was performed as follows: the pretreated wet membrane was only immersed in water at 25° C. for complete curing to form the base membrane.

The high temperature-resistant composite nanofiltration membranes prepared in Examples 1 to 22 and Comparative Examples 1 to 11 were separately tested for high-temperature resistance using a cross-flow membrane testing platform:

(1) a first test conditions: $MgSO_4$ aqueous solution of 2,000 ppm, an operating pressure of 70 psi, a test temperature of 25° C., and a pH value of 6.5 to 7.5; and (2) a second test conditions: the running was carried out for 4 h under a hot water medium of 70° C. and an operating pressure of 70 psi, after that the test was conducted according to the first test conditions.

The results of the high-temperature resistance test are shown in Table 1.

TABLE 1

| Experimental groups | Results after first test conditions | | Results after second test conditions | | Difference between the results of the first test and the second test | |
|---|---|---|---|---|---|---|
| | Water flux (LMH) | Retention rate (%) | Water flux (LMH) | Retention rate (%) | Percentage decrease in water flux (%) | Percentage decrease in retention rate (%) |
| Comparative Example 1 | 38.81 | 99.01 | 20.38 | 98.62 | 47.49 | 0.39 |
| Comparative Example 2 | 36.61 | 99.12 | 22.87 | 98.51 | 37.53 | 0.61 |
| Comparative Example 3 | 24.32 | 99.21 | 20.43 | 98.14 | 16.00 | 1.07 |
| Comparative Example 4 | 45.87 | 88.14 | 36.15 | 50.45 | 21.19 | 37.69 |
| Comparative Example 5 | 18.93 | 98.53 | 16.25 | 96.27 | 14.16 | 2.26 |
| Comparative Example 6 | 35.32 | 90.14 | 32.78 | 74.32 | 7.19 | 15.82 |
| Comparative Example 7 | 10.34 | 99.12 | 9.39 | 98.43 | 9.19 | 0.69 |
| Comparative Example 8 | 41.58 | 99.13 | 30.54 | 95.14 | 26.55 | 3.99 |
| Comparative Example 9 | 30.58 | 99.42 | 27.18 | 98.43 | 11.12 | 0.99 |
| Comparative Example 10 | 40.68 | 98.14 | 33.35 | 96.27 | 18.02 | 1.87 |
| Comparative Example 11 | 32.87 | 99.26 | 26.92 | 98.59 | 18.10 | 0.67 |
| Example 1 | 37.15 | 99.19 | 34.77 | 98.72 | 6.41 | 0.47 |
| Example 2 | 28.91 | 98.85 | 26.87 | 98.52 | 7.06 | 0.33 |
| Example 3 | 25.26 | 98.27 | 22.93 | 98.43 | 9.22 | −0.16 |
| Example 4 | 22.64 | 99.02 | 19.85 | 98.87 | 12.32 | 0.15 |
| Example 5 | 24.62 | 99.18 | 21.28 | 98.63 | 13.57 | 0.55 |
| Example 6 | 36.91 | 99.31 | 32.93 | 98.02 | 10.78 | 1.29 |
| Example 7 | 35.86 | 99.42 | 30.18 | 98.04 | 15.84 | 1.38 |
| Example 8 | 30.91 | 99.31 | 28.72 | 98.06 | 7.09 | 1.25 |
| Example 9 | 31.82 | 98.72 | 27.33 | 98.13 | 14.11 | 0.59 |
| Example 10 | 33.75 | 99.35 | 30.82 | 98.71 | 8.68 | 0.64 |
| Example 11 | 35.62 | 97.18 | 33.22 | 97.23 | 6.74 | −0.05 |
| Example 12 | 40.22 | 97.66 | 32.56 | 97.22 | 19.05 | 0.44 |
| Example 13 | 32.82 | 99.25 | 30.77 | 98.12 | 6.25 | 1.13 |
| Example 14 | 30.76 | 99.15 | 25.31 | 98.04 | 17.72 | 1.11 |
| Example 15 | 26.72 | 98.44 | 22.76 | 97.99 | 14.82 | 0.45 |
| Example 16 | 27.26 | 98.62 | 22.98 | 97.63 | 15.70 | 0.99 |
| Example 17 | 35.66 | 99.25 | 32.33 | 98.05 | 9.34 | 1.2 |
| Example 18 | 34.11 | 99.35 | 31.41 | 98.13 | 7.92 | 1.22 |
| Example 19 | 33.81 | 99.03 | 30.22 | 98.37 | 10.62 | 0.66 |
| Example 20 | 32.93 | 99.39 | 29.11 | 98.15 | 11.60 | 1.24 |
| Example 21 | 37.45 | 99.13 | 32.55 | 98.43 | 13.08 | 0.7 |
| Example 22 | 35.32 | 99.43 | 30.52 | 98.18 | 13.59 | 1.25 |

As can be seen from the data in Table 1:

Comparing with Comparative Examples 1 to 3, in Examples 1 to 22 of the present disclosure, by combining the inorganic salt, silane additive, and polybenzimidazole resin, the composite nanofiltration membranes with higher water flux and high-temperature resistance could be prepared.

Comparing with Comparative Examples 4 to 5, in Examples 1 and 9 to 12 of the present disclosure, by controlling the amine, inorganic salt, silane additive, and deionized water at appropriate mass ratios, the composite nanofiltration membranes with higher water flux and high-temperature resistance could be prepared.

Comparing with Comparative Examples 6 to 7, in Examples 1, 17, and 21 to 22 of the present disclosure, by controlling suitable heating conditions during the preparation of the casting solution, the composite nanofiltration membranes with higher water flux and high-temperature resistance could be prepared.

Comparing with Comparative Examples 8 to 9, in Examples 1 and 19 of the present disclosure, by controlling the appropriate thickness of the wet membrane during the preparation of the base membrane, the composite nanofiltration membranes with higher water flux and high-temperature resistance could be prepared.

Comparing with Comparative Example 10, in Example 1 of the present disclosure, by conducting the pretreatment during the preparation of the base membrane, the composite nanofiltration membrane with higher water flux and high-temperature resistance could be prepared.

Comparing with Comparative Example 11, in Example 1 of the present disclosure, by setting suitable curing conditions of the wet membrane during the preparation of the base membrane, the composite nanofiltration membrane with higher water flux and high-temperature resistance could be prepared.

The above description is merely preferred embodiments of the present disclosure and is not intended to limit the present disclosure, and various changes and modifications of the present disclosure may be made by those skilled in the art. Any modifications, equivalent substitutions, improvements, etc. made within the spirit and scope of the present disclosure should be included within the protection scope of the present disclosure.

What is claimed is:

1. A method for preparing a high temperature-resistant composite nanofiltration membrane, comprising the following steps:

mixing an amine, an inorganic salt, a silane additive, and deionized water evenly at a mass ratio of (0.5-3):(0.5-3):(0.5-3):(91-98.5) to obtain an aqueous phase solution;

mixing a polyacyl chloride and an oil phase solvent evenly at a mass ratio of (0.05-1):(99-99.95) to obtain an oil phase solution;

immersing a base membrane in the aqueous phase solution to obtain a primary base membrane;

immersing the primary base membrane in the oil phase solution to obtain an immersed base membrane; and subjecting the immersed base membrane to a heat treatment to obtain the high temperature-resistant composite nanofiltration membrane;

wherein the method further comprises a step of preparing the base membrane before immersing the base membrane, which is performed as follows:

mixing a polyethersulfone resin, a polybenzimidazole resin, and a N-methylpyrrolidone at a mass ratio of 13:2:85 to obtain a mixture, and stirring the mixture for 4 h to 24 h under heating to obtain a uniformly-dispersed casting solution;

subjecting the uniformly-dispersed casting solution to filtration and vacuum degassing in sequence to obtain a primary casting solution;

coating the primary casting solution evenly onto a non-woven fabric by a membrane casting machine to form a wet membrane; and subjecting the wet membrane to pretreatment and curing in sequence to obtain the base membrane.

2. The method for preparing the high temperature-resistant composite nanofiltration membrane according to claim 1, wherein during the preparing the base membrane, the heating is performed at a temperature of 50° C. to 90° C., and the stirring is performed at a rate of 100 rpm to 900 rpm;

the pretreatment is performed by subjecting the wet membrane to evaporation at room temperature for 3 s to 10 s to obtain a pretreated wet membrane;

the wet membrane has a thickness of 150 μm to 170 μm; and the curing is performed by immersing the pretreated wet membrane in ultrapure water at 5° C. to 16° C. for gel curing to form a preformed membrane; and immersing the preformed membrane in water at 20° C. to 40° C. for complete curing to form the base membrane.

3. The method for preparing the high temperature-resistant composite nanofiltration membrane according to claim 2, wherein during the preparing the high temperature-resistant composite nanofiltration membrane, the immersing the base membrane in the aqueous phase solution is performed for 15 s to 25 s, and after that, a residual aqueous phase solution on a surface of the base membrane is removed by using a rubber roller to obtain the primary base membrane;

the immersing the primary base membrane in the oil phase solution is performed for 10 s to 20 s, and after that, a residual oil phase solution on a surface of the primary base membrane is removed by using the rubber roller to obtain the immersed base membrane; and the heat treatment is performed by subjecting the immersed base membrane to heat preservation in an oven at 30° C. to 90° C. for 1 min to 30 min.

* * * * *